US008347400B2

(12) United States Patent
Zuniga et al.

(10) Patent No.: US 8,347,400 B2
(45) Date of Patent: *Jan. 1, 2013

(54) DOCUMENT ACCESS MANAGEMENT METHOD AND SYSTEM

(75) Inventors: Marco A. Zuniga, Webster, NY (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,531

(22) Filed: Jul. 14, 2011

(65) Prior Publication Data

US 2011/0271355 A1 Nov. 3, 2011

Related U.S. Application Data

(63) Continuation of application No. 11/952,569, filed on Dec. 7, 2007, now Pat. No. 7,984,507.

(51) Int. Cl.
*H04L 9/32* (2006.01)

(52) U.S. Cl. ............................. 726/26; 726/27; 726/28

(58) Field of Classification Search .................. 726/1–7, 726/11, 22–23, 26–30; 713/165–167, 193–194
See application file for complete search history.

(56) References Cited

U.S. PATENT DOCUMENTS

| 6,594,673 | B1 | 7/2003 | Smith et al. |
| 7,016,307 | B2 | 3/2006 | Vasudev et al. |
| 7,069,308 | B2 | 6/2006 | Abrams |
| 7,353,534 | B2* | 4/2008 | Stephens ........................ 726/3 |
| 7,581,101 | B2* | 8/2009 | Ahtisaari ...................... 713/171 |
| 7,984,507 | B2* | 7/2011 | Zuniga et al. ................... 726/26 |

OTHER PUBLICATIONS

"*The Social Network and Relationship Finder: Social Sorting for Email Triage*". Carman Neustaedter, A.J. Bernheim Brush, Marc A. Smith, Danyel Fisher, CEAS 2005.
"*SNARF Makes Social Sense of E-Mail*" by Susan Kuchinskas, InternetNews. Dec. 1 , 2005.
Golbeck et al., "*Inferring Trust Relationships in Web-Based Social Networks*". ACM Transactions on Internet Technology. University of Maryland, Department of Computer Science, 2006, 41 pages and 6 page list of Publications of Golbeck listing document date of 2006. http://en.wikipedia.org/wiki/List_of_social_networking_ websites: Jul. 26, 2007, 4 pages.
"Collective dynamics of small-world networks" DJ Watts, SH Strogatz, Nature 1998.

* cited by examiner

*Primary Examiner* — Hosuk Song
(74) *Attorney, Agent, or Firm* — Fay Sharpe LLP

(57) ABSTRACT

This disclosure provides a document access method and system. The document access method and system are based on a social network model which interconnects members of the social network as a function of trust. This framework provides a basis for documents to be accessed by members which are not directly specified by a document's owner, while providing a certain degree of document security.

20 Claims, 7 Drawing Sheets

DOCUMENT ACCESS MANAGEMENT METHOD AND SYSTEM

This is a continuation of U.S. application Ser. No. 11/952,569, filed Dec. 7, 2007 by Zuniga et al., entitled "DOCUMENT ACCESS MANAGEMENT METHOD AND SYSTEM," incorporated herein by reference in its entirety.

BACKGROUND

This disclosure relates to document access and management. Specifically, this disclosure relates to a trust-model for document access management based on social networks.

Most document access systems are based on a rigid or inflexible structure. To provide access to a document, an owner or creator is required to explicitly state who can access the document. Examples of these conventional systems are the current implementation of DocuShare and Abode Policy Server.

While this rigid structure is ideal for highly confidential documents, it may not be useful for documents that require a certain security level but would also benefit from more access flexibility. For example, the documented results of an initial brainstorming session may require a certain degree of security, however the recipients of the document may want to forward the document to others for their views and ideas, without getting the explicit authorization from the owner of the document.

The use of social networks for information technology has received significant attention in the last few years. Microsoft Research developed SNARF (see "*The Social Network and Relationship Finder: Social Sorting for Email Triage*". Carman Neustaedter, A. J. Bernheim Brush, Marc A. Smith, Danyel Fisher. CEAS 2005; and "*SNARF Makes Social Sense of E-Mail*" by Susan Kuchinskas. InternetNews. Dec. 1, 2005) which is an email application that data-mines social network information present on email traffic to inform the users which are the most important or urgent emails. The Microsoft application is targeted to acquaintances that are one-hop away.

Researchers at the University of Maryland provided a social network solution (see "*Inferring Trust Relationships in Web-Based Social Networks*". Jennifer Golbeck, James Hendler. ACM Transactions on Internet Technology.) which uses trust on social network connections to provide information of incoming emails from people not directly connected to the original sender of an email.

Along the same line of work, other social networking sites (see http://en.wikipedia.org/wiki/List_of_social_networking_websites) provide users with "closeness" information about people willing to connect with them as friends.

One common characteristic of conventional social networks for information technology is to attach social information to arriving documents in order to inform the recipient about the trustworthiness of a particular document. Some examples of this include providing users with tags expressing their interests and subsequently running algorithms to connect users with similar interests (see U.S. Pat. No. 7,069,308, entitled "SYSTEM, METHOD AND APPARATUS FOR CONNECTING USERS IN AN ONLINE COMPUTER SYSTEM BASED ON THEIR RELATIONSHIPS WITHIN SOCIAL NETWORKS"; U.S. Pat. No. 7,016,307, entitled "METHOD AND SYSTEM FOR FINDING RELATED NODES IN A SOCIAL NETWORK"; and U.S. Pat. No. 6,594,673, entitled "VISUALIZATIONS FOR COLLABORATIVE INFORMATION").

This disclosure provides a less rigid approach to a security level associated with a document by leveraging the connections of individuals in a social network. This approach allows a more flexible access structure for documents which are not considered highly confidential, but may require a lesser degree of security.

According to one aspect of this disclosure, social information is attached to departing-documents in order to indicate who can access the document. This is in contrast to conventional systems which attach social information to arriving documents to inform the recipient about the trustworthiness of the document.

INCORPORATION BY REFERENCE

The following documents are totally incorporated herein by reference.

"*The Social Network and Relationship Finder: Social Sorting for Email Triage*". Carman Neustaedter, A. J. Bernheim Brush, Marc A. Smith, Danyel Fisher. CEAS 2005.

"*SNARF Makes Social Sense of E-Mail*" by Susan Kuchinskas. InternetNews. Dec. 1, 2005.

"*Inferring Trust Relationships in Web-Based Social Networks*". Jennifer Golbeck, James Hendler. ACM Transactions on Internet Technology.

http://en.wikipedia.org/wiki/List_of_social_networking_websites.

"Collective dynamics of small-world networks" D J Watts, S H Strogatz, Nature 1998.

U.S. Pat. No. 7,069,308, entitled "SYSTEM, METHOD AND APPARATUS FOR CONNECTING USERS IN AN ONLINE COMPUTER SYSTEM BASED ON THEIR RELATIONSHIPS WITHIN SOCIAL NETWORKS."

U.S. Pat. No. 7,016,307, entitled "METHOD AND SYSTEM FOR FINDING RELATED NODES IN A SOCIAL NETWORK."

U.S. Pat. No. 6,594,673, entitled "VISUALIZATIONS FOR COLLABORATIVE INFORMATION."

BRIEF DESCRIPTION

In one aspect of this embodiment, a method of operating a document access system is disclosed. The method of operating the document access system comprising generating a model which represents all members of an information technology social network, the model associating an intermember trust value for each member relative to each other member of the social network; and associating a document trust value requirement and document owner for one or more documents, the document trust value requirement providing a minimum intermember trust value, relative to the document owner, necessary for access to a respective document.

In another aspect of this embodiment, a document access system network is disclosed. The document access system network comprising one or more servers; and a plurality of member computers, the user computers operatively connected to the one or more servers, wherein the one or more servers are configured to generate a model which represents all members of the document access system network, the model associating an intermember trust value for each member relative to each other member of the document access system network, and the one or more servers are configured to associate a document trust value requirement and document owner for one or more documents, the document trust value requirement providing a minimum intermember trust value, relative to the document owner, necessary for access to a respective document.

In another aspect of this embodiment, a document access system network is disclosed. The document access system network comprising one or more servers; and a plurality of member computers, the user computers operatively connected to the one or more servers, wherein the one or more servers are configured to generate a model which represents all members of the document access system network, the model associating an intermember trust value for each member relative to each other member of the document access system network, and the one or more servers are configured to associate a document trust value requirement and document owner for one or more documents, the document trust value requirement providing a minimum intermember trust value, relative to the document owner, necessary for access to a respective document.

DETAILED DESCRIPTION

This disclosure, and exemplary embodiments therein, leverages the connections of individuals in a social network to allow flexible access of documents. These documents may range from a very low level of security or confidentiality to a very high confidential status.

Substantively, the methods and systems disclosed are based on a common behavior in social environments: If a person A trusts person B, and person B trusts person C, then person A will be more inclined to share information with person C. The detailed description which follows discusses the analytical framework to bring this social behavior to the area of document access management. Further, the document access management methods and systems disclosed provide the means for implementing this analytical framework.

Organizations have documents with different levels of confidentiality. On the one hand, documents such as financial reports may be available only to a minimum or handful of people. On the other hand, documents which are associated with recreational activities have virtually no confidential status and are intended to reach all members of an organization. Somewhere in the middle of these extremes is a group of documents which require some level of confidentiality, and some access flexibility. Examples of the later type of documents may include a draft of an initial proposal related to a system design, a document containing initial ideas related to a brainstorming session, etc.

In conventional document access management systems, the owner of a document adds a contact to a distribution list which allows the contact specific rights of access to the document. This method of managing access to documents is highly effective for highly confidential documents because the owner can control who is granted access to the documents. However, this method of managing access to documents may not be adequate for documents that could benefit from a confidentiality-accessibility tradeoff.

Figure 1:
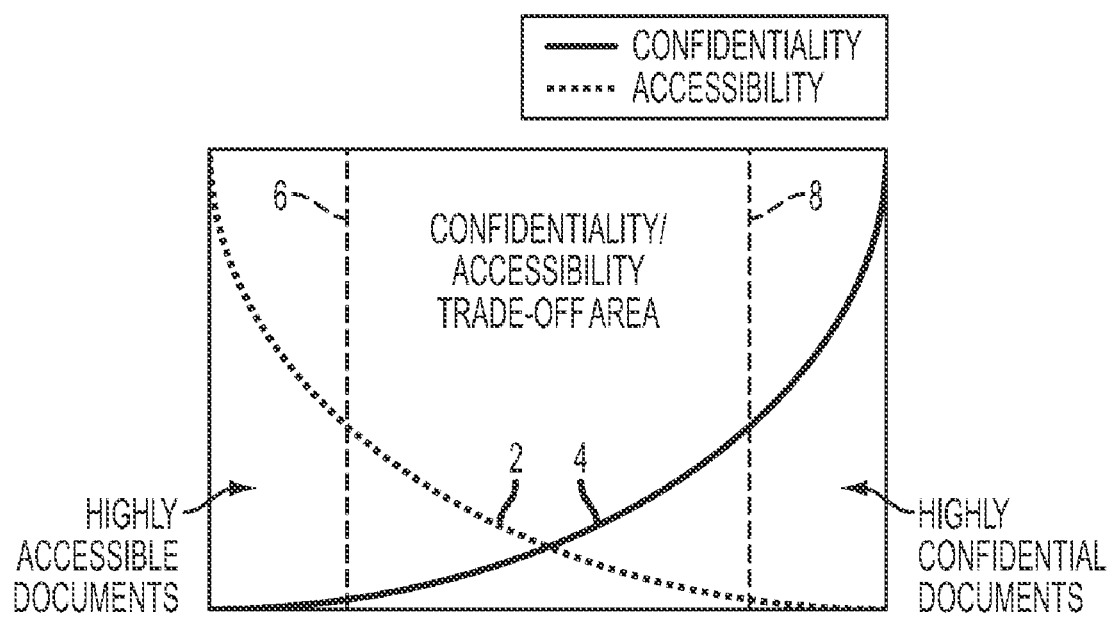
FIG. 1 graphically illustrates the confidentiality-accessibility tradeoff associated with a document.

With reference to FIG. 1, schematically illustrated is this confidentiality-accessibility tradeoff which shows types of documents which are specifically targeted by the methods and systems disclosed herein. Notably, the methods and systems disclosed herein can also be utilized for highly accessible documents and highly confidential documents.

With continuing reference to FIG. 1, the dotted curve 2 represents accessibility and the solid curve 4 represents confidentiality. On the left side of the figure, where minimal confidentiality is required, the documents are considered to be highly accessible. On the right side of the figure, where high confidentiality is required, access rights are uniquely assigned to a few users. This is what this disclosure refers to as the rigid area of the confidentiality-accessibility trade-off graph. The middle area of the graph identifies a confidentiality/accessibility trade-off area between the vertical dotted lines 6 and 8. This area of the graph represents documents which are targeted by the document access methods and systems disclosed herein.

Conventionally, access for documents in the middle of the spectrum shown in FIG. 1 is done in the following way. Person A has a proposal document and person A creates an access list which lists each and every person whom has access privileges to the document. For example, person A may create an access list which includes a small circle of co-workers within person A's corporate department. To enlarge the access list, a co-worker may suggest to person A that it would be valuable to have a person B outside their department view the document which requires person A to add person B to the access list. This approach basically extends the security method designed for highly confidential documents for use under potentially less-confidential circumstances.

The conventional approach described above includes at least two disadvantages. (1) the access-assignment process must be updated, possibly frequently, to provide access to the document for people not originally granted access privileges; and (2) this rigid structure does not exploit the underlying social network to broaden the visibility of documents to trustworthy people not directly connected to the owner of the document.

To target the middle area of FIG. 1, provided is an analytical framework which includes a model. Notably, this model is not unique or an optimal solution; other models can be created to capture the concept of overlay trust networks based on trust links in social networks. The main purpose of the model disclosed herein is to provide one exemplary model for leveraging social network interactions to provide document access management.

The Model

Trust among individuals in a social network can be represented by a weighted directed graph G(V,E) [see "*Trust Relationships in Web-Based Social Networks*". Jennifer Golbeck, James Hendler. Inferring, ACM Transactions on Internet Technology.], where V represents the vertices (people) and E the edges (trust). The trust values between two people range from 0 to 1, where 1 is associated with the highest level of trust.

Given G, for a given vertex u (person), a shortest path algorithm can be run to find the shortest path from u to all the other vertices. Assume $\vec{\tau}_{uv}$ is the vector containing the edges of the shortest path from u to v, and $\tau_{uv}^i$ is the trust value for the $i^{th}$ element on $\vec{\tau}_{vu}$. Then, for two vertices that are not directly connected, the trust that u has on v can be defined as:

$$T_{uv} = \tau_{uv}^1 \prod_{i=2}^{|\vec{\tau}_{uv}|} f(\tau_{uv}^i) \qquad (1)$$

where $f(.)$ represents how much weight is given to the trust-links of people indirectly connected to us. Some people are more prone to trust than others, hence, $f(.)$ should capture in some way the personality of the person. Depending on personality, $f(.)$ can be defined to decrease at a high or low rate as follows:

$$f(\tau_{uv}^i) = (\tau_{uv}^i)^r \qquad (2)$$

where $r \geq 0$, hence the more prone a person is to trust other people, the lower r for that person. It is important to observe that trust is a monotonically decreasing function with respect to the number of hops.

The previous equations provide a trust value from any vertex to all the other vertices in a social network. Now, a parameter ($l_{th}$) is introduced to allow the user to determine who can access the document. The set of users S that can access a document is given by:

$$S = \{v \in V | T_{uv} > l_{th}\}$$

The previous expression denotes that only users whose trust value is higher than $l_{th}$ can have access to the document. The parameter $l_{th}$ allows the user to set some security level for her documents. For example, a high $l_{th}$ could be used for more confidential documents.

The previous threshold $l_{th}$ allows a user to set the confidentiality level of the document, and as a result, the extent of his or her trusted network. However, in some scenarios it may be necessary to limit the capability of the user to share information. For example, while the freedom of exchanging files in a social website may be entirely given to the user, a more confidential environment like a high tech company may prefer to set some limits to the extent that non-confidential documents could be shared. In order to provide some global control over access management, it is ideal to provide a minimum global threshold $g_{th}$. This threshold works in the following way. Given a graph G of a social network, initially, any trust-links below $g_{th}$ are blacklisted, which would lead to a new graph G'. Hence, given the original graph G(V,E), G' is given by:

$$G' = (V, E')$$

Where $$E' = \{\tau \in E | \tau > g_{th}\}$$

Next, a shortest path algorithm is run and trust equations (1) and (2) for G' are calculated. The new graph G' limits the number of contacts that a vertex can have as his or her trusted network. Finally, the trust model M requires four inputs to determine the trusted network of a vertex for a given document:

$$S = M(G, f(.), g_{th}, l_{th})$$

To further enhance security, some users may want to keep documents within a maximum number of hops from themselves according to the confidentiality of the document. Presented below is one method to provide further security measures in order to limit the maximum number of hops that a document can *move away* from its owner.

Assuming that people are well-meaning, but imperfect, they will all try to keep the document confidential, but there is a small chance that someone will make a mistake and leak it. If the probability that a person will leak the document is p and the chance that they won't is q=1−p, then the probability that nobody leaks the document is $q^N$ where N is the number of people with access. If $l_{th}$ is our desired security level such that the probability of confidentiality is greater than $l_{th}$, then the maximum number of people that should be allowed access to the document is given by:

$$N < \log_q l_{th}$$

If our social network graph has a typical fan-out of z, then $N > z^k$, where k is the maximum number of allowed hops. Finally, the maximum number of hops k that a document can travel is given by:

$$k < \log_z(\log_q l_{th})$$

Simulations

In order to test the model discussed above, a simulation was performed over Small World Graphs [see "Collective dynamics of small-world networks" D J Watts, S H Strogatz, Nature 1998.]. Small World Graphs are a widely accepted model for social networks, and the aim was to test the model on these graphs to have an idea of the feasibility of the trust-model on a real social network. Trust between people is represented by combining uniform and Gaussian random variables, where the trust from vertex u to v is defined as:

$$\tau_{uv} \sim U(0,1)$$

where U(0,1) is a uniform random variable between 0 and 1. Further, denote n=N($\tau_{uv}$,σ), as an instance of a Gaussian random variable with mean $\tau_{uv}$ and standard deviation σ, then define the trust from vertex v to u as:

$$\tau_{vu} = \begin{cases} 0, & n < 0 \\ n, & 0 \leq n \leq 1 \\ 1, & 1 < n \end{cases}$$

Notably, the previous equations denote the fact that there is some correlation between the directional trust of two people.

Figure 2:
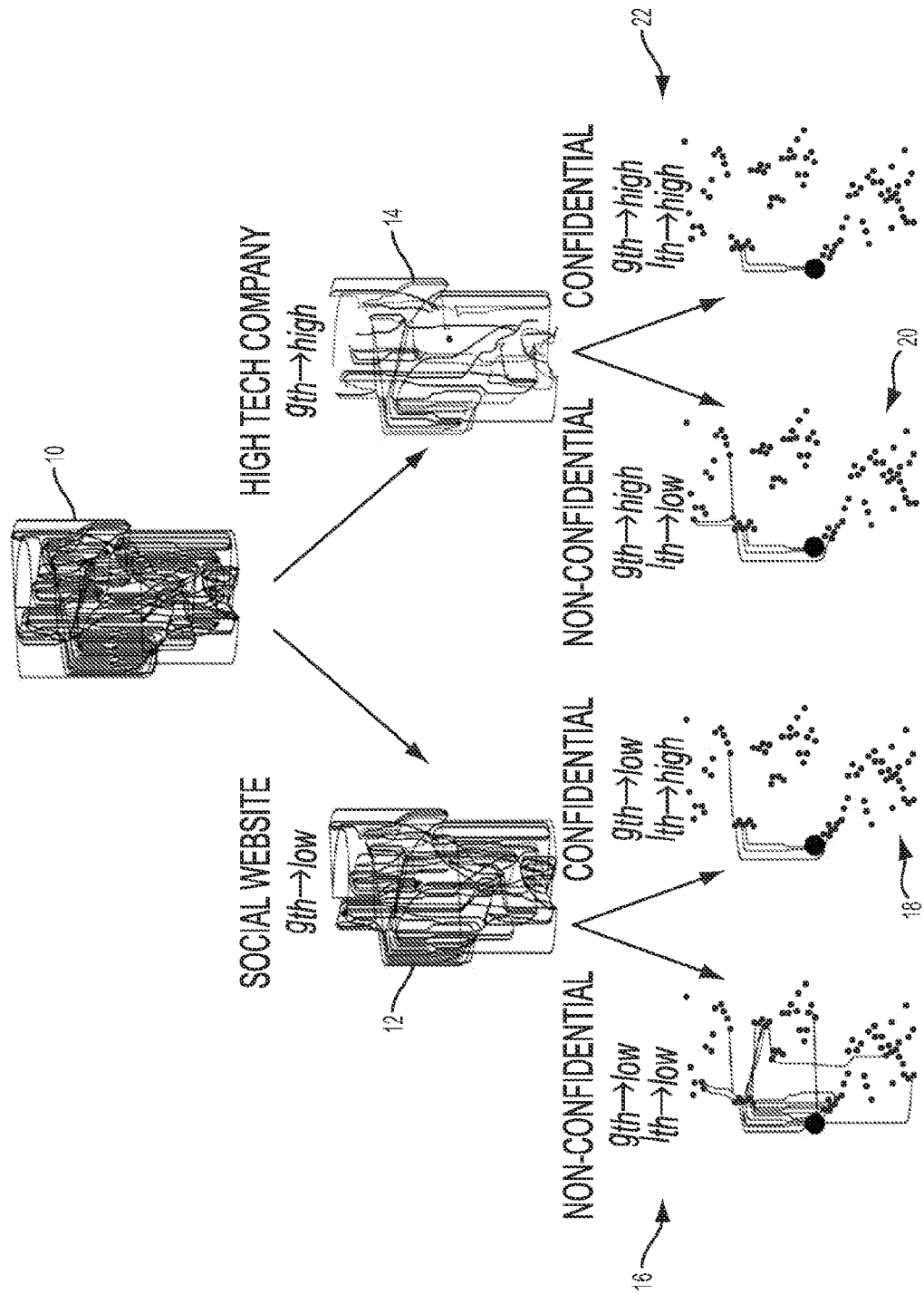
FIG. 2 illustrates a tree representation of overlay trust networks.

With reference to FIG. 2, presented is the impact that $g_{th}$ and $l_{th}$ have on the extent of the trusted network for a sample vertex. The figure is presented as a tree. At the root of the tree 10 is depicted a simulated social network G, then we present two graphs, 12 and 14, G' based on the global threshold $g_{th}$. A low value of the global threshold (graph 12) would blacklist only a few low-trust links, while a high value (graph 14) would let only high-trust links available. Then, depending on the confidentiality of the document, a user can set a high or low $l_{th}$ to determine a soft bound on her trusted network. It is important to note that while a low $g_{th}$ allows significant freedom to the user to determine the soft bound, a high $g_{th}$ limits to a great extent the impact of $l_{th}$, i.e. for a high $g_{th}$ the size of the trusted network is small (secure) for both high and low $l_{th}$.

This method could be also applied to provide access to different levels of information. For example, a low threshold may allow many people to access an abstract which only is a small portion of a document, while a high threshold may allow access to the whole document.

FIG. 2 provides a tree representation of overlay trust networks. The root of the tree 10 represents a social network where edges represent trust values between 0 and 1. The next levels 12 and 14 represent the resulting graph G' after blacklisting links below $g_{th}$. A low $g_{th}$ 12 could be used for non-secure environments such as social websites, and high $g_{th}$ 14 could be used for high-secure environments such as corporate offices. The global threshold determines to a great extent the underlying communication structure. The next levels of the tree (16, 18, 20 and 22) represent the view from the user perspective. If the global threshold is low, the user has significant freedom to increase the size of his or her trust network. If the global threshold is high, the user has limited control to increase the size of his or her trust network through $l_{th}$, trust networks for high and low $l_{th}$ are similar.

With reference to FIGS. 3-7, illustrated are various exemplary features and embodiments of the document access method and system discussed herein.

For additional clarity, the following definitions are provided.

G(V,E) Directed graph representing social network, where V represents the vertices (people) and E the edges (trust)

Figure 3:
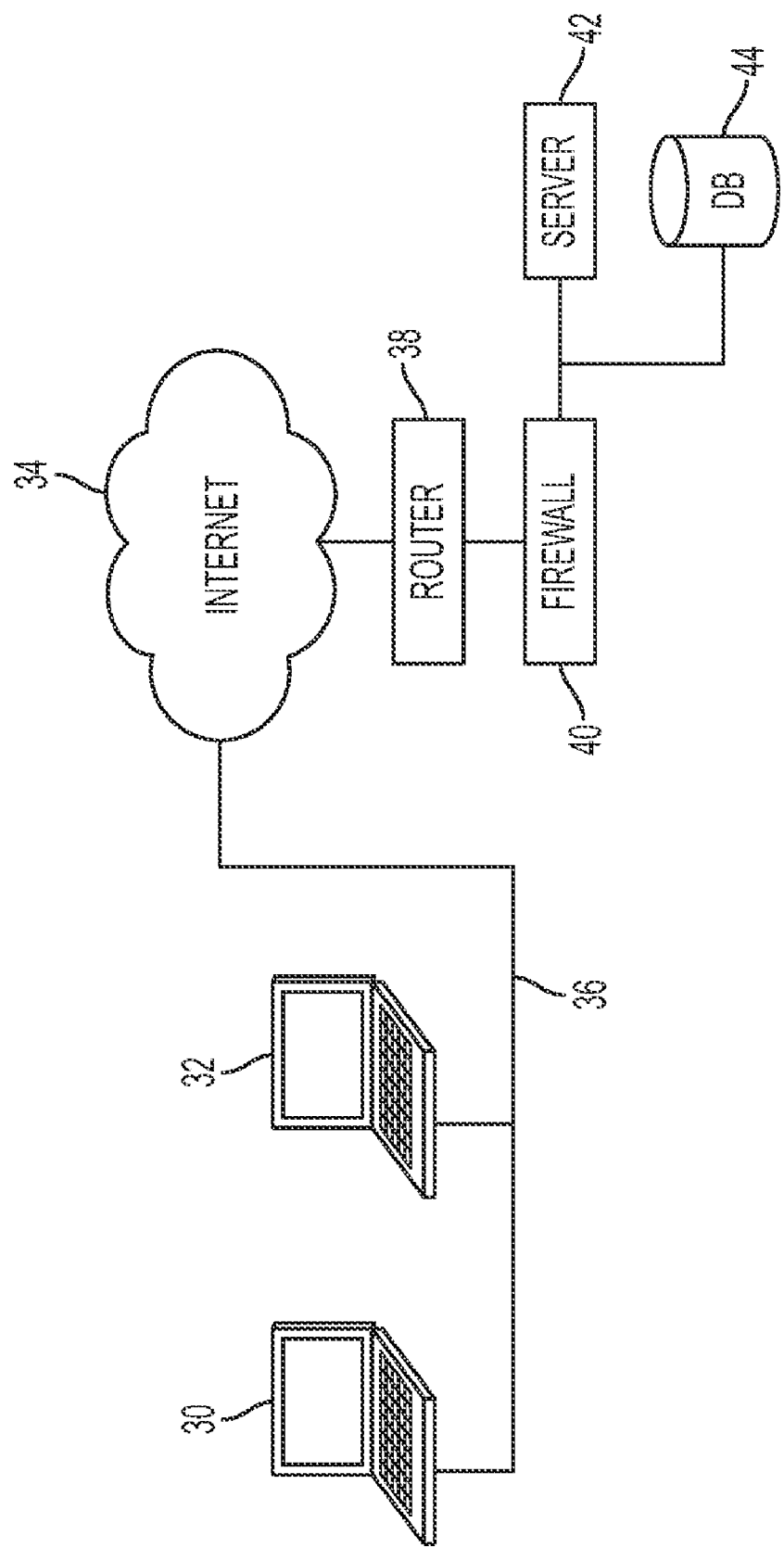
FIG. 3 schematically illustrates a public social network according to an exemplary embodiment of this disclosure.
Figure 4:
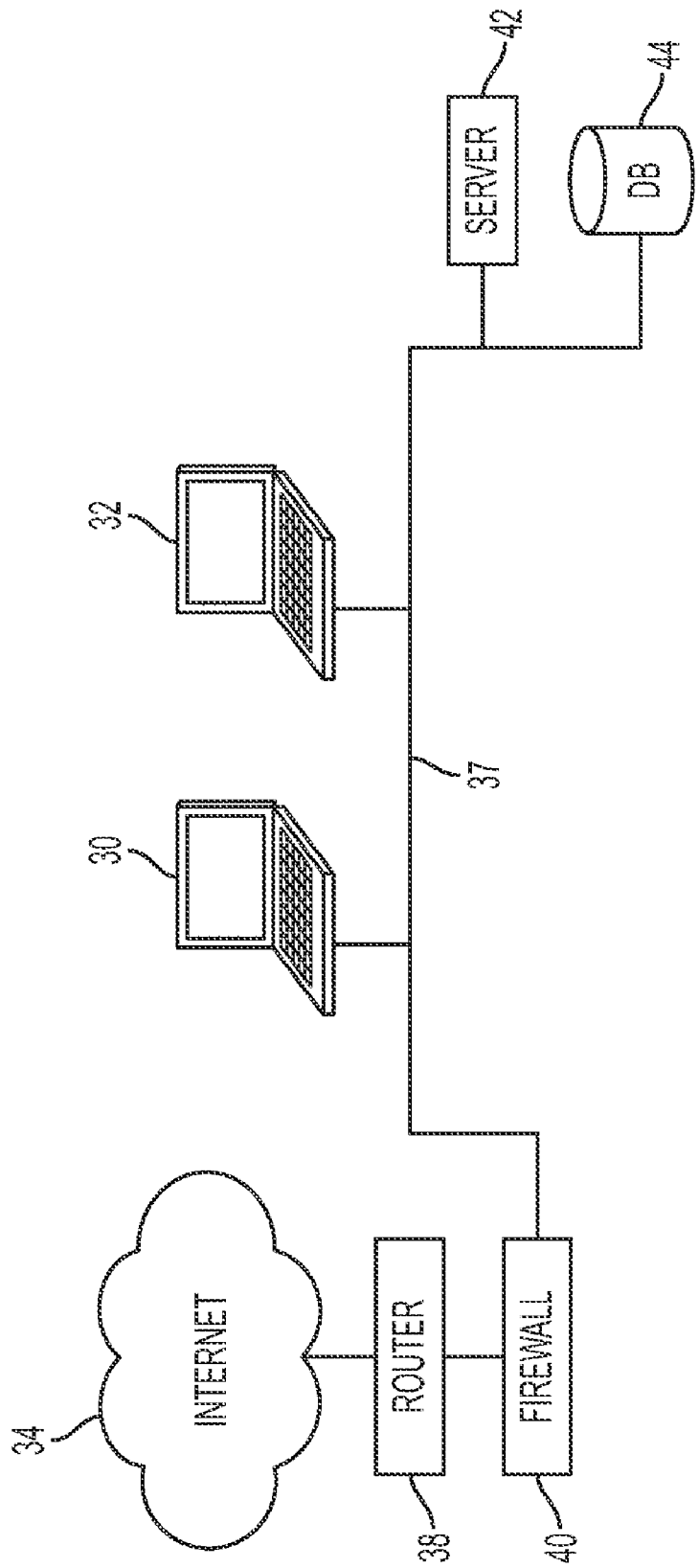
FIG. 4 schematically illustrates a private corporate intranet social network according to an exemplary embodiment of this disclosure.

$\tau_{uv}$ Vector containing the edges of the shortest path from node u to node v $T_{uv}$ Trust that node u has on node v S Set of users that can access a given document $l_{th}$ Trust level required to access a document, set by user $g_{th}$ Minimum trust level required by an edge to be valid, set by admin With reference to FIGS. 3 and 4, illustrated are exemplary embodiments of a system used inside or outside a firewall, respectively.

FIG. 3 illustrates an example of a public social network and FIG. 4 illustrates an example of a private corporate network.

The document access system illustrated in FIG. 3 includes a first user terminal 30, a second user terminal 32, internet communication lines 36, the Internet 34, a router 38, a firewall 40, a server 42 and a database 44. The document access system operates by way of a user communicating via terminals 30 and/or 32. The user terminals 30 and 32 communicate with the server 42 and database 44 by way of the communication lines 36, the internet 34, the router 38 and the firewall 40, which are operatively connected to the server 42 and database 44. The database 44 provides the necessary storage of the trust model and associated code to execute algorithms for providing document access according to this disclosure.

Notably, the firewall 40 is operatively connected between the router 38 and server 42/database 44 to provide secure communications between the user terminals 30 and 32, to the server 42/database 44.

The document access system illustrated in FIG. 4 includes all of the components of the public social network illustrated in FIG. 4, however the user terminals 30 and 32 are operatively connected to the server 42/database 44 by means of communication line(s) 37.

Notably, firewall 40 secures communicates between the internet 34 and user terminals 30 and 32, and between the internet 34 and the server 42/database 44.

Figure 5:
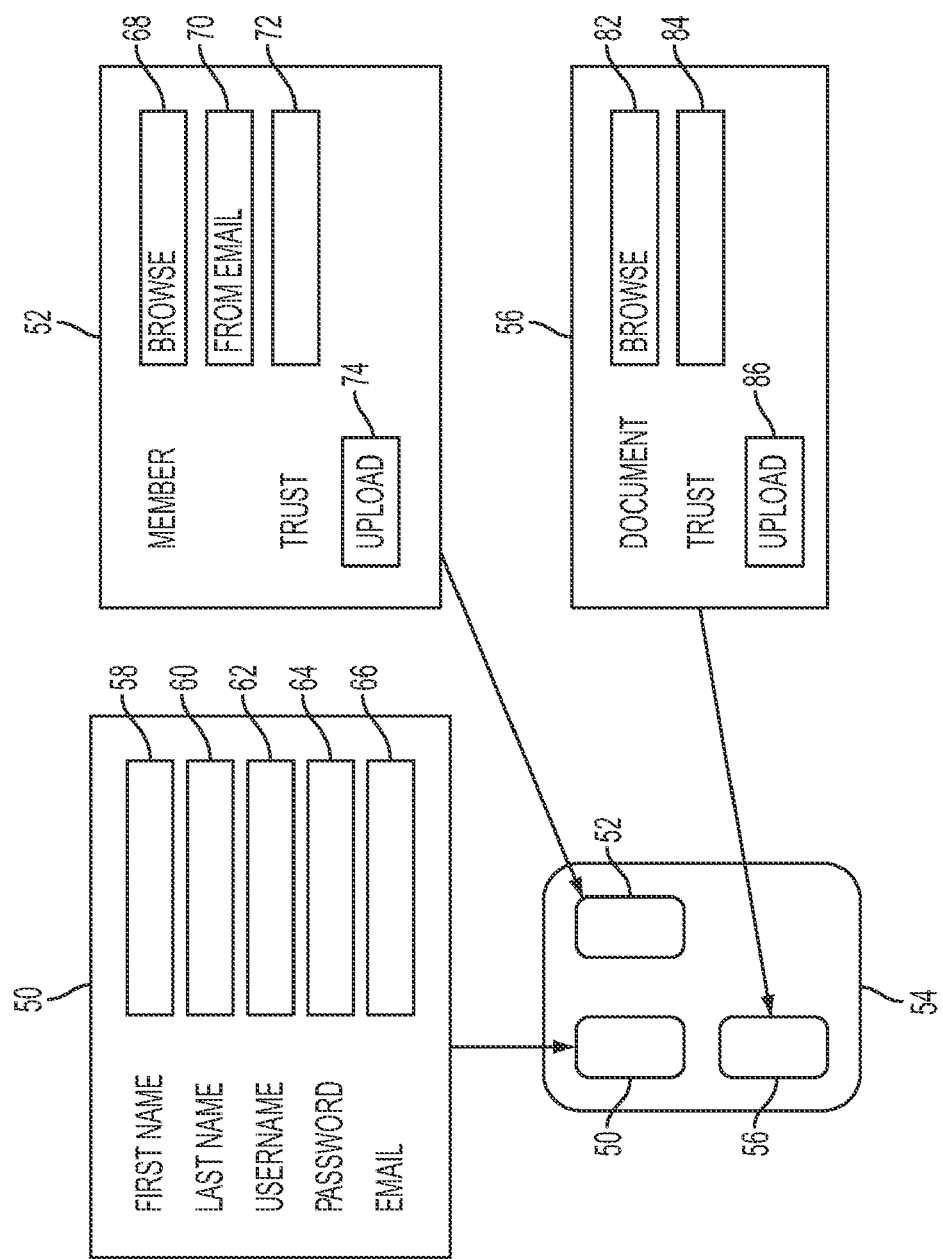
FIG. 5 schematically illustrates a user interface according to an exemplary embodiment of this disclosure.

With reference to FIG. 5, illustrated is a user registering system according to an exemplary embodiment of this disclosure. This system provides a means for the user to submit information about his social network and the trust relationship with his acquaintances. The user starts by selecting files to be shared, which must be accompanied by the level of trust required to access the files. Alternatively, the user can start by uploading information about his social network from his email client, i.e., a utility can present the user with some recommendations for trust level according to the frequency of communication, and the user can modify trust levels before uploading his or her social network information.

The exemplary user registering system illustrated in FIG. 5 includes a user data entry screen 54. The data entry screen 54 includes a user profile data entry block 50, an intermember trust data entry block 52 and a document profile data entry block 56.

Data associated with the user profile data entry block 50 includes a user's first name 58, last name 60, username 62, password 64 and email address 66.

Data associated with the intermember trust data entry block includes one or more member files associated with the user, where the member files are accessed by browsing 68 a directory and/or selecting a particular member from email 70. After selection of a particular member, the user assigns a trust value in trust field 72.

After trust values are assigned to other members within the networks, the user uploads 74 the data to a server and/or database.

Data associated with the document profile data entry block 56 includes one or more document files and associated trust values. Specifically, a user can browse 82 directories to select a particular document file. After selection of a particular document file, the user assigns a trust value to the trust field 84 which will be associated with the selected document file.

In addition, an upload 86 feature enables a user to upload the document profile data to a server and/or database.

Figure 6:
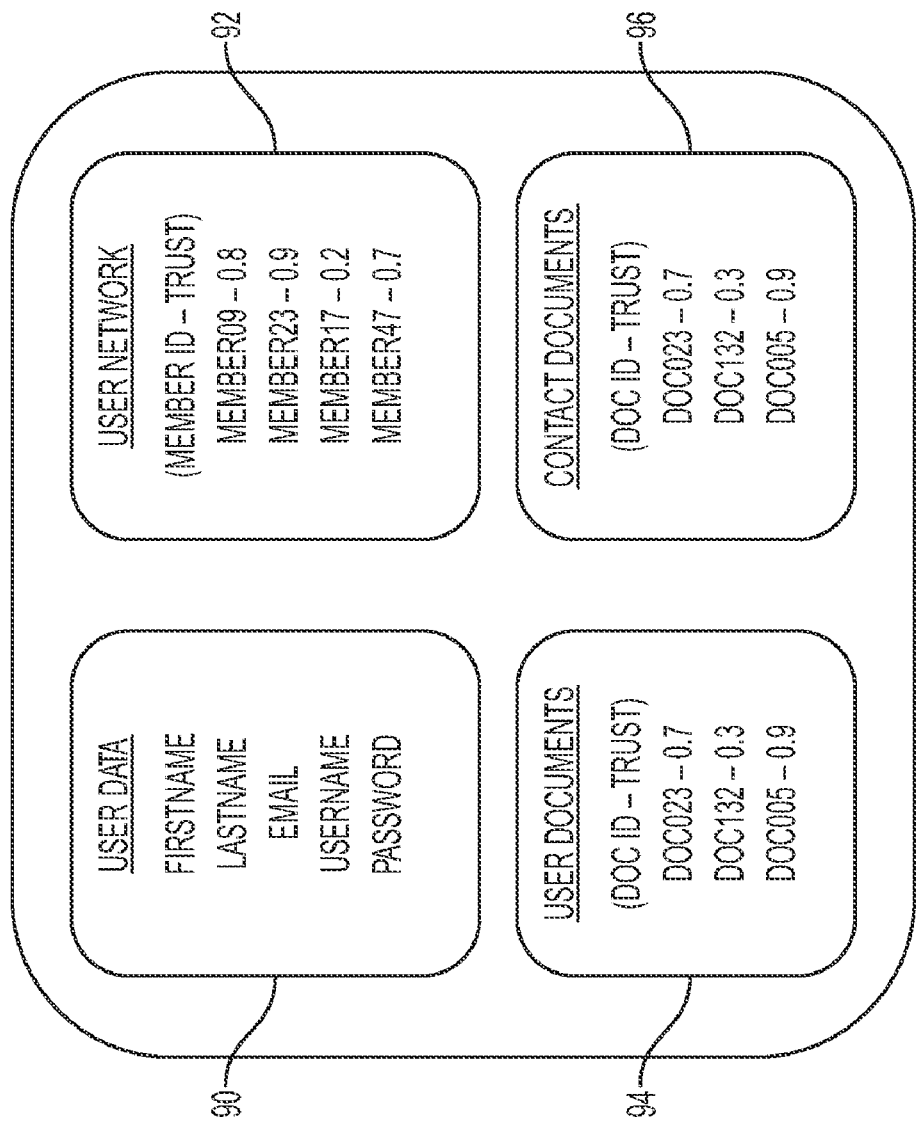
FIG. 6 schematically illustrates a database structure according to an exemplary embodiment of this disclosure.
Figure 7:
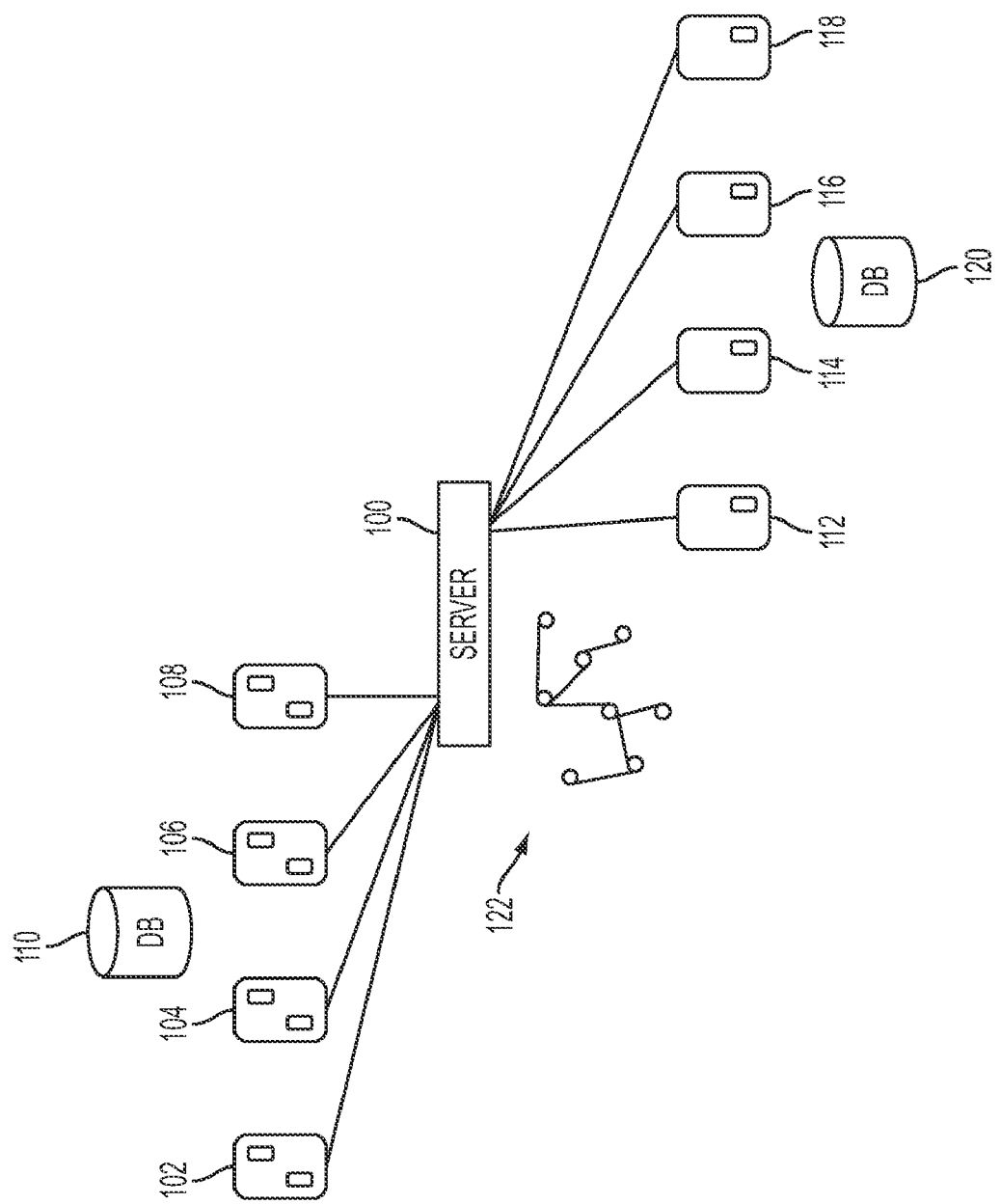
FIG. 7 schematically illustrates a document access and management system according to an exemplary embodiment of this disclosure.

The information gathered via the user data entry screen 54 illustrated in FIG. 5 is populated in a database on a per user basis, as shown in FIG. 6. Using the information in the data tables, the server will inform the users in the network what documents can be accessed by them, as illustrated in FIG. 7.

With reference to FIG. 6, illustrated is an exemplary database associated with the data acquired by user interface 54 illustrated in FIG. 5.

A user data block 90 includes data fields containing the user's first name, last name, email, username and password.

A user network data block 92 includes member id data and associated trust value data assigned by the user. The trust values range from 0-1.0, where 1.0 indicates the highest level of trust. For example, member 09 is assigned a trust value of 0.8, member 23 is assigned a trust value of 0.9, member 17is assigned a trust value of 0.2, and member 47 is assigned a trust value of 0.7.

A user's documents data block 94 includes user document id data and associated trust value data assigned by the user. The trust values range from 0-1.0, where 1.0 in dictates the highest level of trust required to access the associated document. For example, document doc 023 is assigned a trust value of 0.7, document doc 132 is assigned a trust value of 0.3 and document doc 005 is assigned a trust value of 0.9.

A contact documents data block 96 includes the set of documents that belong to other people but that can be accessed by the user because his trust level with other users is high enough to access some of their documents.

With the information shown in FIG. 5, from all the users, the server constructs the graph G (V, E). Next, it finds the shortest path for all pair of nodes in G. Then, the server blacklists all edges whose trust level is below $g_{th}$, leading to graph 122 illustrated in FIG. 7. Then the algorithm applies equation (1) for each one of these pairs. These calculations lead to $T_{uv}$, which then is used in conjunction with $l_{th}$ and the table shown in FIG. 6 to provide the set of members M that can access each document. This information is populated in the FIG. 6 table and the member is informed about the new files that can be accessed.

With reference to FIG. 7, illustrated is a schematical representation of the inter operability of the document access system.

The document access system includes a server 100 which is operatively connected to database blocks 110 and 120. Database block 110 includes all user data files, for example a first user data file 102, a second user data file 104, a third user data file 106 and a fourth user data file 108. Database block 120 includes all document data files, for example a first document data file 112, a second document data file 114, a third document data file 116 and a fourth document data file 118.

Graph 122 is generated by the server 100, as previously discussed, by finding the shortest path for all pairs of nodes in G(V,E), where G(V,E) is constructed from all user data, and subsequently back listing all edges with a trust level below $g_{th}$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of operating a document access system, the document access system including one or more servers and a plurality of member computers, the member computers operatively connected to the one or more servers, the method comprising:
    the document access system generating a model which represents all members of an information technology social network, the model associating an intermember trust value for each member relative to each other member of the information technology social network;
    the document access system associating a document trust value requirement and document owner for one or more documents, the document trust value requirement providing a minimum intermember trust value, relative to the document owner, necessary for access to a respective document; and
    providing access to a document for a set of members as a function of an effective trust value.

2. The method of operating a document access system according to claim 1, wherein generating a model comprises:
    generating a directed graph G (V,E) representing the information technology social network, where V represents the people as vertices and E represents the intermember trust as edges.

3. The method of operating a document access system according to claim 2, the method comprising:
    wherein the effective trust value is associated with the shortest path from the document owner's vertices to each respective member, wherein the shortest path is a function of connecting intermember trust edges from the document's owner to the respective members.

4. The method of operating a document access system according to claim 3, the effective trust value calculated according to the method comprising:
    multiplying each edge trust value associated with each path from the document's owner to the other members.

5. The method of operating a document access system according to claim 4, further comprising:
    comparing the document's trust value with the effective trust value associated with each other member, relative to the document's owner; and
    providing access to only members with an effective trust value greater than or equal to the document's trust value.

6. The method of operating a document access system according to claim 1, the method comprising:
    generating a database for storing document's trust attributes and member trust attributes.

7. The method of operating a document access system according to claim 6, the method comprising:
    interfacing with members to acquire data for the database.

8. The method of operating a document access system according to claim 1, the method comprising:
    comparing the document trust value with an administratively determined minimum trust value; and
    attributing the administratively determined minimum trust value to any document associated with an owner assigned document trust value greater than the minimum trust value.

9. The method of operating a document access system according to claim 1, the method comprising:
    informing members which documents they can access.

10. A document access system comprising:
    a computer configured to execute a method of operating a document access system, the document access system including one or more servers and a plurality of member computers, the member computers operatively connected to the one or more servers, the method comprising:
    the document access system generating a model which represents all members of an information technology social network, the model associating an intermember trust value for each member relative to each other member of the information technology social network;
    the document access system associating a document trust value requirement and document owner for one or more documents, the document trust value requirement providing a minimum intermember trust value, relative to the document owner, necessary for access to a respective document; and
    providing access to a document for a set of members as a function of an effective trust value.

11. A document access system according to claim 10, wherein generating a model comprises:
    generating a directed graph G (V,E) representing the information technology social network, where V represents the people as vertices and E represents the intermember trust as edges.

12. A document access system according to claim 11, wherein the effective trust value is associated with the shortest path from the document owner's vertices to each respective member, wherein the shortest path is a function of connecting intermember trust edges from the document's owner to the respective members.

13. A document access system according to claim 12, the effective trust value calculated according to the method comprising:
    multiplying each edge trust value associated with each path from the document's owner to the other members.

14. A document access system according to claim 13, further comprising:
    comparing the document's trust value with the effective trust value associated with each other member, relative to the document's owner; and
    providing access to only members with an effective trust value greater than or equal to the document's trust value.

15. A document access system according to claim 10, the method comprising:
    generating a database for storing document's trust attributes and member trust attributes.

16. A document access system according to claim 15, the method comprising:

interfacing with members to acquire data for the database.

17. A document access system according to claim 10, the method comprising:

comparing the document trust value with an administratively determined minimum trust value; and attributing the administratively determined minimum trust value to any document associated with an owner assigned document trust value greater than the minimum trust value.

18. A document access system according to claim 10, the method comprising:

informing members which documents they can access.

19. A document access system network comprising:

one or more servers; and a plurality of member computers, the user computers operatively connected to the one or more servers, wherein the one or more servers are configured to execute a method of operating a document access system, the document access system including one or more servers and a plurality of member computers, the member computers operatively connected to the one or more servers, the method comprising:

the document access system generating a model which represents all members of an information technology social network, the model associating an intermember trust value for each member relative to each other member of the information technology social network;

the document access system associating a document trust value requirement and document owner for one or more documents, the document trust value requirement providing a minimum intermember trust value, relative to the document owner, necessary for access to a respective document; and providing access to a document for a set of members as a function of an effective trust value.

20. The document access system network according to claim 19, wherein the one or more servers are configured to generate a directed graph G (V,E) representing the document access system network, where V represents the members as vertices and E represents the intermember trust as edges.

* * * * *